United States Patent
Yaary et al.

(10) Patent No.: US 9,575,823 B2
(45) Date of Patent: Feb. 21, 2017

(54) RECORDING UNSTRUCTURED EVENTS IN CONTEXT

(71) Applicant: Hewlett-Packard Development Company, L.P., Houston, TX (US)

(72) Inventors: Erez Yaary, Yehud (IL); Eli Mordechai, Yehud (IL); Kobi Eisenberg, Sunnyvale, CA (US); Adi Kidron, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/759,711

(22) PCT Filed: Apr. 29, 2013

(86) PCT No.: PCT/US2013/038656
§ 371 (c)(1),
(2) Date: Jul. 8, 2015

(87) PCT Pub. No.: WO2014/178819
PCT Pub. Date: Nov. 6, 2014

(65) Prior Publication Data
US 2015/0370618 A1    Dec. 24, 2015

(51) Int. Cl.
*G06F 3/00* (2006.01)
*G06F 9/54* (2006.01)
*G06Q 10/06* (2012.01)
*G06F 9/50* (2006.01)

(52) U.S. Cl.
CPC .............. *G06F 9/542* (2013.01); *G06F 9/5011* (2013.01); *G06Q 10/06314* (2013.01)

(58) Field of Classification Search
CPC ........................................................ G06F 9/542
USPC ................................................... 719/318, 319
See application file for complete search history.

(56) References Cited

U.S. PATENT DOCUMENTS

| 7,203,479 B2 | 4/2007 | Deeds |
| 7,424,646 B2 | 9/2008 | Smith |
| 7,849,030 B2 | 12/2010 | Ellingsworth |
| 8,260,773 B2 | 9/2012 | Jennings, III et al. |
| 8,335,473 B2 | 12/2012 | Liao |
| 2006/0116178 A1* | 6/2006 | Vuong .............. H04M 1/72566 455/574 |

(Continued)

OTHER PUBLICATIONS

M. Cecelia, Specifying Temporal Behavior in Hypermedia Documents, 1992.*

(Continued)

*Primary Examiner* — Lechi Truong
(74) *Attorney, Agent, or Firm* — Hewlett Packard Enterprise Patent Department

(57) ABSTRACT

Recording an unstructured event in context can include detecting a first occurrence indicative of a start to the unstructured event utilizing a sensing feature of a client device. Upon detection of the first occurrence, device activity data associated with the client device is tracked. A second occurrence indicative an end to the unstructured event is detected utilizing the sensing feature. Following detection of the second occurrence, an event object for the unstructured event spanning between the first and second events is presented. The event object includes or is otherwise associated with the device activity data tracked during the timespan.

17 Claims, 4 Drawing Sheets

(56) References Cited

U.S. PATENT DOCUMENTS

| | | | |
|---|---|---|---|
| 2008/0154897 A1 | 6/2008 | Meliha et al. | |
| 2010/0306018 A1 | 12/2010 | Burtner et al. | |
| 2011/0167357 A1 | 7/2011 | Benjamin et al. | |
| 2012/0253493 A1* | 10/2012 | Andrews | H04W 4/021 700/94 |
| 2014/0136529 A1* | 5/2014 | Zhang | G06F 17/30486 707/723 |

OTHER PUBLICATIONS

International Search Report & Written Opinion received in PCT Application No. PCT/US2013/038656, Jan. 22, 2014, 10 pages.
Madan, A. et al., "Vibefones: Socially Aware Mobile Phones," (Research Paper), 10th IEEE International Symposium on Wearable Computers, Oct. 11-14, 2006, pp. 109-112.

* cited by examiner

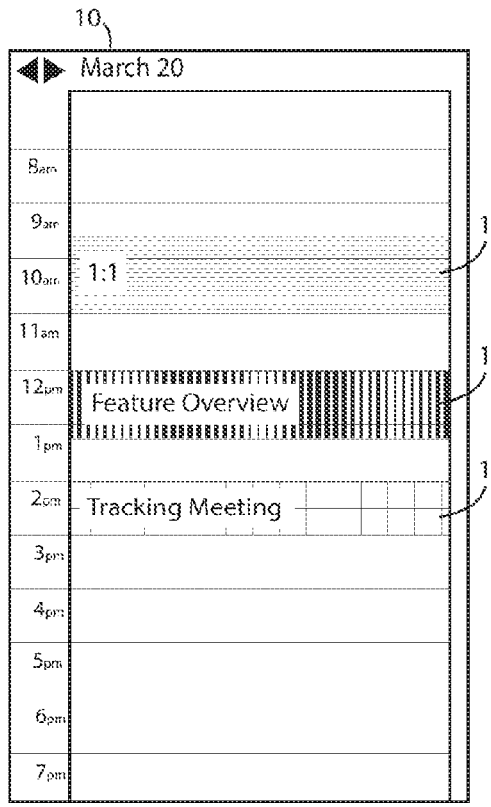
PLANNED SCHEDULE
FIG. 1a
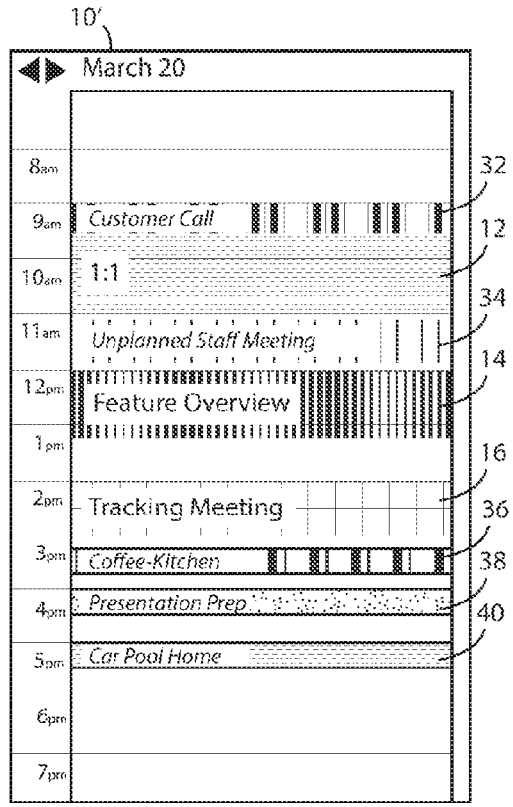
ACTUAL SCHEDULE
FIG. 1c
FIG. 1b

RECORDING UNSTRUCTURED EVENTS IN CONTEXT

BACKGROUND

Calendar applications allow users to schedule events with selected attendees. Each event is digitally represented by an event object that identifies a predetermined time period and selected attendees. An event object can also include additional details such as a slideshow presentation, links for accessing selected information, and any other items an event organizer might include or otherwise attach. The event object appears in each attendee's calendar and spans the predetermined time period. After the event, a given attended can refer back to that event object as needed to review the context of the event.

DRAWINGS

FIG. 1a-1c are screen views of example user interfaces.

DETAILED DESCRIPTION

Introduction

Figure 2:
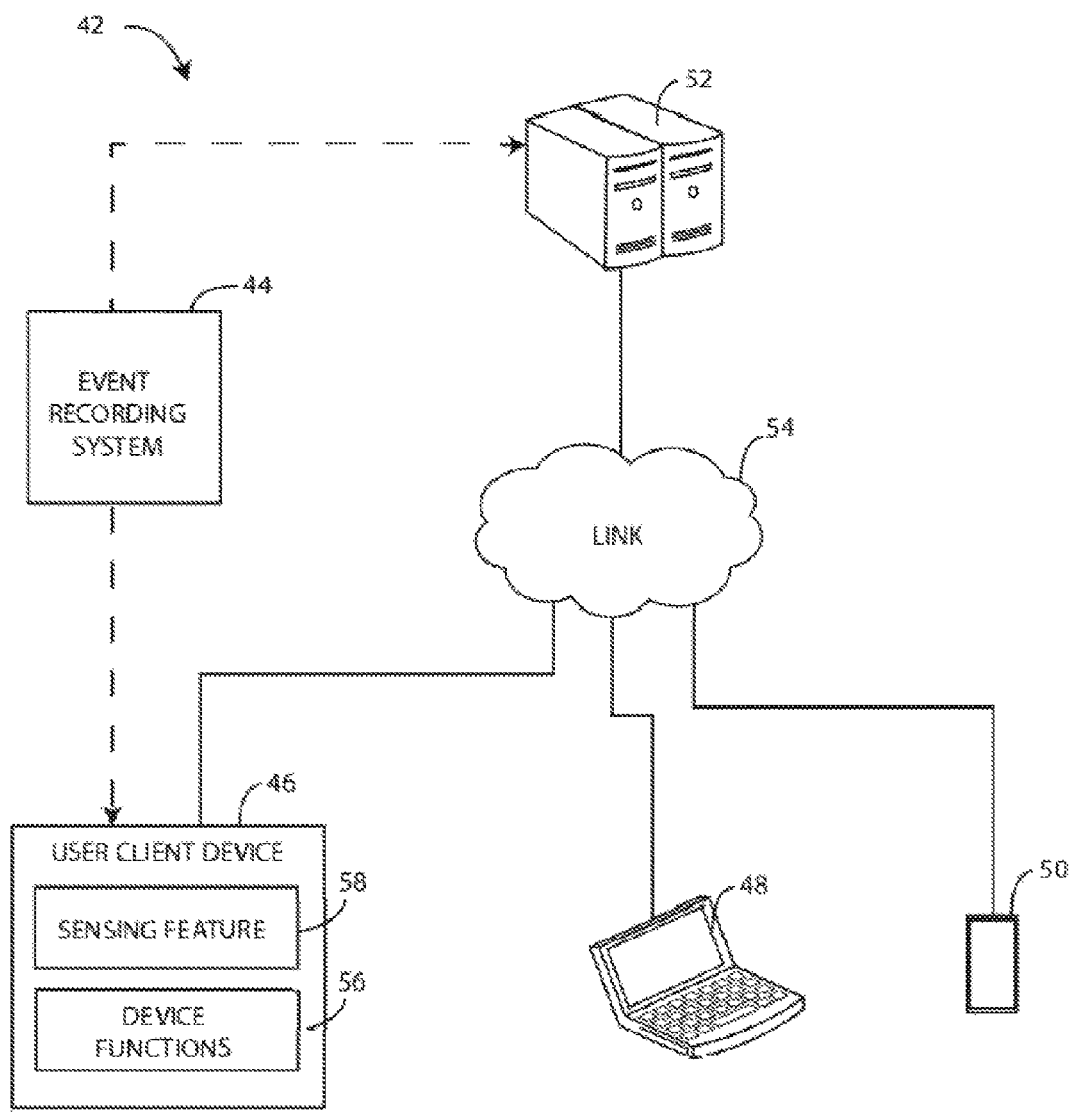
FIG. 2 is a block diagram depicting an example environment in which various embodiments may be implemented.

While an individual may plan various events over a day, reality often renders that schedule incomplete due to impromptu meetings and other schedule changes. Scheduled events are recorded as event objects for use by any number of calendaring applications. Such events can thus be referred to as structured events with corresponding event objects including the time periods for the events, participants, and any attachments or other data that can provide additional event context. Impromptu or non-scheduled events, on the other hand, are not recorded and the participant's memory is often the only source of context. Thus, with structured events, a participant can refer back to the event object to recall the context of an event. For unstructured events, a participant is left to her own memory to recall any event related activities.

Embodiments described below operate to help detect and record unstructured events in context. The context, here, includes information corresponding to activities related to the event. Such activities can include accessing documents, communicating messages, sharing documents, and any other participant action taken during the event. An event can be an in person meeting such as a gathering in a common location or a remote meeting such as a phone call, instant messaging session, or virtual meeting. It is also noted that events such as commutes to and from work can have a single participant.

Various embodiments described in detail below operate by detecting a first occurrence indicative of a start to the unstructured event. The occurrence is detected utilizing a sensing feature of a client device. Such an occurrence may, for example, include the positioning of two or more client devices, such as smart phones, within proximity of one other. Another occurrence may be triggering of a virtual meeting using a client device. Upon detection of the first occurrence, device activity data associated with the client device is then tracked. This data can include any data related to an activity by the user that can be monitored by the client device such as messages sent and received, documents accessed, web pages browsed, and audible conversations.

The device activity is tracked until the detection of a second occurrence indicative an end to the unstructured event. Such an occurrence, for example, may include the client device moving out of proximity of the other client devices or the cling of a virtual meeting as detected utilizing the sensing feature. Following detection of the second occurrence, an event object for the unstructured event spanning between the first and second events is presented. The event object includes or is otherwise associated with the device activity data tracked during the timespan. That event object may be displayed, for example, as a calendar item such that the user can look back at a day's events and review activities that occurred during those events. However, event objects can be stored in any type of repository from which they can be searched.

The following description is broken into sections. The first, labeled "Illustrative Examples," presents example screen views of a user interface for a calendar application and a user interface in which a user is prompted to record an unstructured event. The second section, labeled "Components," describes examples of various physical and logical components for implementing various embodiments. The third section, labeled as "Operation," describes steps taken to implement various embodiments.

Illustrative Example

FIG. 1a depicts a screen view of planned schedule 10 which, in this example, includes event objects 12, 14, and 16. These are events scheduled ahead of time and included on the person's calendar. The user can access the calendar to preview the day's events and later to review the day's activities. An individual's day is often more hectic than their calendar indicates with added impromptu meetings, telephone calls, and other unstructured events popping up throughout the day. With the aid of a user's smart phone, tablet, or other computing device, embodiments described below operate to detect such unstructured events as they occur and, while in progress, monitor user activities associated with that computing device. Upon detecting a conclusion to an unstructured event, an event object can be saved. That object includes or is otherwise associated with a record of the monitored activities.

FIG. 1b depicts a screen view of a user interface 18 through which the user is prompted to save an event object. The event object includes details 20 which in this example include an event subject, location, start and end times, a listing of participants. Details 20 may be entered manually or populated automatically by the user's computing device. Here, for example, the location and timing information may be populated automatically using the positioning features and clock of the computing device, while the user may enter the event subject. Participant information may also be detected and populated automatically using communication feature of the user's computing device.

Interface 18 also allows user to select, using controls 22-28, from among plurality of device activity types monitored during the corresponding event. In this example, monitored event types include pictures taken, messages communicated, files accessed, and web pages viewed. The user has selected to include pictures using control 22 and files accessed using control 26. Through control 30 the user can choose to save the event object to include or otherwise be associated with activity data of types selected using controls 22-28. Once saved, the event can be added, after the fact, to the user's calendar. FIG. 1c depicts a screen view of the user's actual schedule after the day's unstructured events have been detected and recorded. The user can now access additional event objects 32-40 to review the day's otherwise unstructured events.

Components

FIG. 2 depicts an example environment 42 in which embodiments may be implemented as event recording system 44. Environment 42 is show to include client devices 46, 48, and 50, and server device 52. Components 46-52 are interconnected via link 54. Link 54 represents generally any infrastructure or combination of infrastructures configured to enable electronic communication between components 46-52. For example, link 52 may represent the internet, one or more intranets, and any intermediate routers, switches, and other interfaces. Client devices 46-50 represent generally any computing device with which a user may interact to communicate with other client devices and server device 50 via link 54. Server device 50 represents generally any computing device configured to serve an application and corresponding data for consumption by client devices 44-48.

Client device 46 is shown to include device functions 56 and sensing feature 58. Device functions 56 represent generally the hardware and programming for providing the computing functions for which device 46 is designed. Such hardware can include a processor and memory, display and any physical user input buttons. The programming can include an operating system and applications. Sensing feature 58 represents generally any component configured to detect a change in state of client device 44. Such a change in state may be an environmental state that can be correlated with the occurrence of an event to be recorded. For example, sensing feature may include any of a positioning feature, an accelerometer, and a communication feature that can be used to detect device position, motion, and proximity to client device 48 and 50. Sensing feature 58 may also include a microphone and camera for use in monitoring audio and visual signals generally proximate to device 46. Sensing feature 58 may be software configured to detect the start and stop of phone calls, virtual meetings, and other events where the client device facilitates interaction between the user and another individual.

Event recording system 44, discussed in more detail below, represents generally a combination of hardware and programming configured to record events in context. Briefly, event recording system, 44 is configured to, through use of sensing feature 58, detect an occurrence of an event, monitor device activities during the event, and generate an event object that includes or is otherwise associated with those device activities. System 44 may be wholly integrated within device functions 56. System 44 may be implemented was a component of server device 52 where it takes action based in part on data received from device functions 56 and sensing feature 58 via link 54. System 44 may be distributed across client device 44 and server device 52 where, for example, event detection and activity monitoring are performed on device 46 and the corresponding event records are generated by server device 52. It is noted that event recording system 44 may also be included on client devices 48 and 50.

Figure 3:
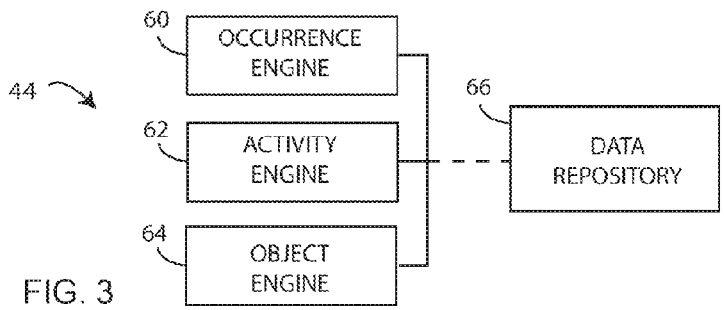
FIG. 3 is a block diagram depicting an example of a system for recording unstructured events.
Figure 4:
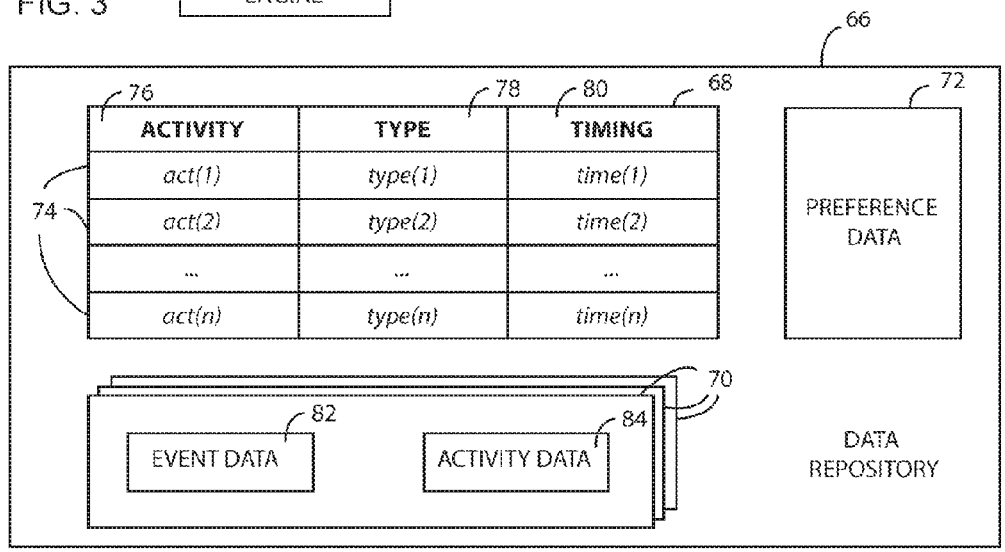
FIG. 4 is a block diagram depicting an example data structure for recording unstructured events.
Figure 5:
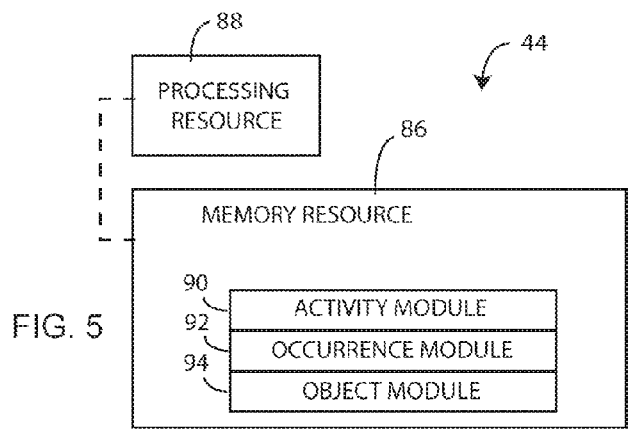
FIG. 5 is a block diagram depicting a memory resource and a processing resource according to an example.

FIGS. 3-5 depict examples of physical and logical components for implementing various embodiments. In FIG. 3 various components are identified as engines 60-64. In describing engines 60-64, focus is on each engine's designated function. However, the term engine, as used herein, refers to a combination of hardware and programming configured to perform a designated function. As is illustrated later with respect to FIG. 5, the hardware of each engine, for example, may include one or both of a processor and a memory, while the programming is code stored on that memory and executable by the processor to perform the designated function.

FIG. 3 is a block diagram depicting components of recording system 44. In this example, system 44 includes occurrence engine 60, activity engine 62, and object engine 64. In performing their respective functions, engines 60-64 may access data repository 66. Repository 66 represents generally any memory accessible to system 44 that can be used to store and retrieve data. Occurrence engine 60 represents a combination of hardware and programming configured to utilize a sensing feature of a client device to detect the occurrence of an unstructured event. Restated, an unstructured event is an occurrence that is correlated with a client device state detected by the sensing feature of the client device.

Such device states can take various forms. For example, utilizing the sensing feature, occurrence engine 60 may detect a device state in which the client device has moved within range of one or more other client devices and has remained in range for a threshold time period. Such a state is indicative of and may be correlated with the occurrence of a meeting. Here sensing feature may include a positioning feature that utilizes GPS, Wi-Fi or other radio communication for triangulation. Sensing feature may also include short range wireless communication such as NFC (Near Field Communication) such that signal detection from another client device indicates relatively close proximity between the two. In another example, sensing feature may include the client device's microphone such that captured audible signals can be compared to audible signals captured by other client devices. When the audible signals captured by two or more devices match, it can be presumed that those client devices are in proximity and that a meeting is occurring. The device state is one in which the device's captured audible signal matches the audible signal captured by another device.

As an example, occurrence engine 60 may detect a device state by detecting an occurrence of a first condition followed in time by the occurrence of a second condition. The first condition is indicative of an event start and the second condition of an event end. The some period between the conditions corresponds to the time period of the detected event. Continuing with the examples above, the first condition may be met upon detecting that the client device is in proximity with another client device and has remained in proximity for a threshold period. The second condition may be met upon detecting that the client device is no longer in proximity of the other client devices or is moving away from the other devices.

Activity engine 62 represents a combination of hardware and programming configured to maintain device activity data for a client device during a time period associated with an unstructured event. The device activity data is data indicative of a user's interaction with the client device during that unstructured event. Device activity data can be categorized into any of a number of data types based on the functionality of the given client device. Device activity data can include data indicative of documents accessed, web sites browsed, pictures taken, conversations recorded, messages communicated, and any other data that may be recorded by client device. Thus, the device activity data defines, at least in part, a context of the unstructured event.

Object engine 64 represents a combination of hardware and programming configured to, following the identification of the second condition by the occurrence engine 60, present an event object that includes or is otherwise associated with the device activity data. Presenting the event object can include generating and saving the event object. As noted the device activity data can include a plurality of data types. Object engine 64 may perform its function by communicating a prompt indicating that an unstructured event has been detected. FIG. 1b provides an example. Through the prompt, the user is allowed to select from among the plurality of data types and indicate whether or not to store the device activity data. Upon receiving a response to the prompt that the activity device is to be stored, object engine 64 is configured to record the event object such that the event object includes or is otherwise associated with only the device activity data matching the data types selected via the prompt.

Object engine 64 may also be configured to maintain data type preferences indicative of data types selected via previous prompts such that, by default, previously selected data types are selected by default in a current prompt. In other words, object engine 64 may be configured to maintain data type preferences indicative of a first data type selected via previous prompts and a second data type not selected via the previous prompts. Thus, when presenting a current prompt, device activity data for the first type is selected by default and data of the second type is not. Looking back to FIG. 1b as an example, types 22 and 28 may have been selected by default as represented by check marks while types 24 and 28 were not.

In performing its function, activity engine 62 may track device activity data starting when occurrence engine 60 detecting the first condition such as when the client device is in proximity with another client device. Activity engine 62 may continue to track the device activity data until occurrence engine 60 detects the second condition such as when the client device is no longer in proximity with the other device. In an example, the first condition may be met upon the occurrence of a first trigger followed, after a predetermined first time frame, by a second trigger. The second condition may be met upon the occurrence of a third trigger followed within a predetermined second time frame by a fourth trigger. The first trigger is a change of state of the client device detected by occurrence engine 60 using the device's sensing feature. This change of state can be correlated with the possibility of the beginning of an unstructured event. For example the first trigger may include the client device coming into proximity of another client device as detected by using the client devices communication or positioning feature. The second trigger includes the client device remaining in that state for a threshold period such that it can be correlated with a likelihood that the unstructured event is in progress. For example, the second trigger may include the client device remaining in proximity of the other client device for a minimum period.

The second condition may be met upon the occurrence of a third trigger followed, within a predetermined second time, frame by a fourth trigger. The third trigger is a change of state of the client device detected by occurrence engine 60 using the device's sensing feature. This change of state can be correlated with the possibility of the end of the unstructured event. For example the third trigger may include the client device moving as detected using the client devices accelerometer or positioning feature such as when the user stands and begins walking. The fourth trigger is a detected device state that can be correlated with a likelihood that the unstructured event has ended. For example, the fourth trigger may include the client device leaving the proximity of the other client device as detected using the client device's positioning or communication feature. Thus, the initial device motion signals a possibility or hint that the event is ending, and the device moving out of proximity signals a likelihood that that the event has ended.

Activity engine 62 is configured to begin to track the device activity upon the occurrence of the first trigger and stop tracking if the second trigger occurs within the first time frame. Upon occurrence of the second trigger after the expiration of the first time frame, activity engine 62 continues to track the device activity until the occurrence of the fourth trigger. Object engine 64 may be configured to present the event object only upon occurrence of the fourth trigger. That event object includes or is otherwise associated with the device activity tracked between the occurrence of the first and third triggers.

FIG. 4 depicts an example implementation of data repository 66. In this example, repository 66 includes device activity data 68, event objects 70, and preference data 70. Device activity log 68 represents the activity data maintained by activity engine 62. Activity log 68 includes a number of entries 74 each populated with data in an activity field 76, type field 78, and timing field 80. Data in activity field 76 identifies a given activity such as a photo taken, a web page accessed, a message sent or received, a file accessed, or any other action taken using the given client device. That data may include a description of the activity or, depending on the activity type, the results of the activity. For example, where the device activity includes browsing web pages, data in activity field 76 may include the addresses browsed. Where the activity includes taking photos, data in activity field can include a copy of a photo or a reference that can be used to access the photo. Likewise, where the activity includes accessing files or sending and receiving messages, data in activity field 76 can include copies of the files or messages or references for accessing the same.

As noted, device activity data can be categorized into any of a number of data types. Thus, data in type field 78 identifies the activity type for a corresponding entry 74. Again, examples include photos taken, message sent or received, files accessed, and any other data type that can be recorded or otherwise monitored by a client device. Data in timing field 68 indicates a time that the activity associated with a given entry 74 was recorded by the client device.

Event objects 70 represent unstructured events detected by occurrence engine 60 and generated by object engine 64. Each event object 70 is shown to include event data 82 and activity data 84. Event data 82 includes data identifying a corresponding unstructured event detected by occurrence engine 60. Referring back to FIG. 1b, such information may be information depicted as details 20 which can include an event subject, location, start and stop times, and participants. Activity data 84 represents the activity data maintained by activity engine 62 that was recorded between the start and end times identified by occurrence engine 62. That activity data 84 may be data from the activity fields 76 of the corresponding entries 74 in log 68, or it may include data acquired using information from those fields 76.

As noted above, object engine 64 may also be configured to maintain data type preferences indicative of data types selected via previous prompts such as interface 18 depicted in FIG. 1b. Upon occurrence engine 60 detecting the end of an unstructured event, object engine 64 may present a prompt such as interface 18 through which the user can select types of activity data to include in a corresponding object record 70. Object engine 64 can maintain a record of such selections as preference data 72. Analyzing past selections, object engine 64 can identify activity types likely to be selected and then, by default, select those types to include in a corresponding event object 70. For example, where a give type is selected a threshold number of consecutive times, that type may be selected by default.

In foregoing discussion, engines 60-64 were described as combinations of hardware and programming. Engines 60-64 may be implemented in a number of fashions. Looking at FIG. 5, the programming may be processor executable instructions stored on tangible memory resource 86 and the hardware may include processing resource 88 for executing those instructions. Thus memory resource 86 can be said to store program instructions that when executed by processing resource 88 implement system 44 of FIG. 3.

Memory resource 86 represents generally any number of memory components capable of storing instructions that can be executed by processing resource 88. Memory resource 86 is non-transitory in the sense that it does not encompass a transitory signal but instead is made up of more or more memory components configured to store the relevant instructions. Memory resource 86 may be implemented in a single device or distributed across devices. Likewise, processing resource 88 represents any number of processors capable of executing instructions stored by memory resource 86. Processing resource 88 may be integrated in a single device or distributed across devices. Further, memory resource 86 may be fully or partially integrated in the same device as processing resource 88, or it may be separate but accessible to that device and processing resource 88.

In one example, the program instructions can be part of an installation package that when installed can be executed by processing resource 88 to implement system 44. In this case, memory resource 86 may be a portable medium such as a CD, DVD, or flash drive or a memory maintained by a server from which the installation package can be downloaded and installed. In another example, the program instructions may be part of an application or applications already installed. Here, memory resource 86 can include integrated memory such as a hard drive, solid state drive, or the like.

In FIG. 5, the executable program instructions stored in memory resource 86 are depicted as activity module 90, occurrence module 92, and object module 94. Activity module 90 represents program instructions that when executed cause processing resource 88 to implement activity engine 60 of FIG. 3. Occurrence module 92 represents program instructions that when executed cause the implementation of occurrence engine 60. Likewise, object module 94 represents program instructions that when executed cause the implementation of object engine 64.

Operation

Figure 6:
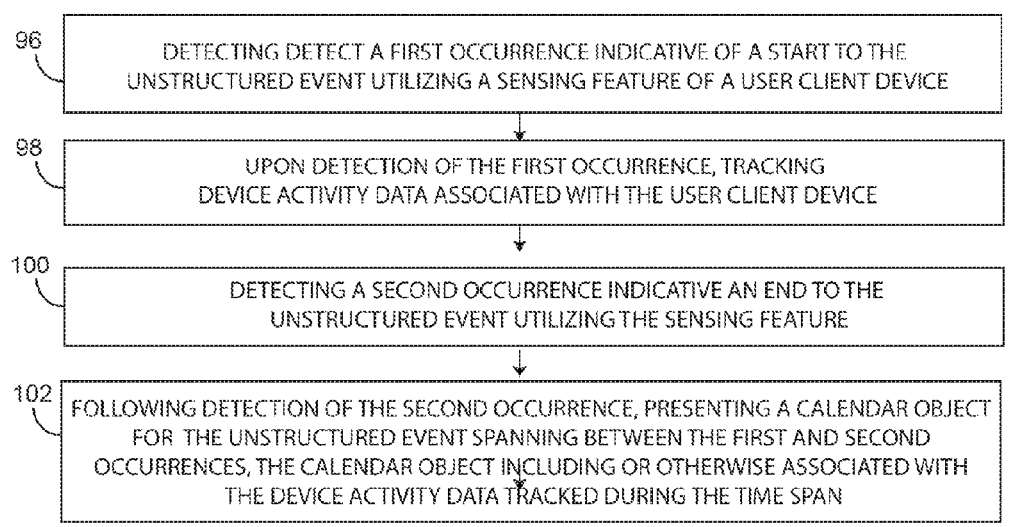
FIG. 6 is a flow diagram depicting steps taken to implement an example.

FIG. 6 is a flow diagram of steps taken to implement a method for recording an unstructured event in context. In discussing FIG. 6. reference may be made to the screen views of FIGS. 1a, b, and c and the components depicted in FIGS. 2-5. Such reference is made to provide contextual examples and not to limit the manner in which the method depicted by FIG. 6 may be implemented.

A first occurrence is detected utilizing a sensing feature of a client device (step 96). The first occurrence is indicative of a start to the unstructured event. Referring back to FIG. 3, occurrence engine 60 may be responsible for implementing step 96. Step 96 may be accomplished, for example, by using a positioning or communication feature of a client device to detect that the device and presumably its user has come into proximity of one or more other client devices and their users. Such an occurrence can be indicative of the start of a meeting between those users. Other first occurrences can include the start of a virtual meeting, phone call, or any other client device facilitated interaction between the device's user and another.

Upon detection of the first occurrence, device activity data associated with the client device is tracked (step 98). Referring again to FIG. 3, activity engine 62 may be responsible for implementing step 98. The activity data can be indicative of any activity that can be recorded by the corresponding client device such as messages communicated, web pages and files accessed, voice recordings, and photo and videos captured. The activity data can be tracked, for example, by recording the activity in a log such as activity log 68 depicted in FIG. 4.

A second occurrence indicative of an end to the unstructured event is detected utilizing the sensing feature (step 100). Referring back to FIG. 3, occurrence engine 60 may be responsible for implementing step 100. Step 100 may be accomplished, for example, by using a positioning or communication feature of a client device to detect that the device and presumably its user are no longer in proximity of the other client device or devices. Such an occurrence can be indicative of the end of a meeting between those users. Other second events can include closing of a virtual meeting, ending of a phone call or any other change in client device state indicative of the end of an event.

Following detection of the second occurrence, an event object is presented (step 102). The event object is for the unstructured event and spans between the first and second events. The event object includes or is otherwise associated with the device activity data tracked during the timespan between the first and second occurrences detected in steps 96 and 100. Referring again to FIG. 3, object engine 64 may be responsible for implementing step 102. An event object may be presented, for example, by communicating a prompt through which the user of the client device can select from among various types of tracked activity data and to record the a corresponding event object including only the selected types of activity data tracked during the timespan.

Detecting a first occurrence in step 96 can include detecting an occurrence of a first trigger followed after a predetermined first time frame by a second trigger. Detecting the second occurrence in step 100 can include detecting an occurrence of a third trigger followed within a predetermined second time frame by a fourth trigger. Tracking, in step 98, then includes beginning to track the device activity data upon the occurrence of the first trigger and stopping to track if the second trigger does not occur within the first time frame. The first trigger, for example; can include the client device coming into proximity of another client device. The second trigger occurs when the device remains in proximity for at least the first time frame. The third trigger can include the client device moving with respect to the other client device, and the fourth trigger can be met when the client device continues to move for the second time frame. Presenting in step 102 can then include presenting the event object only upon occurrence of the fourth trigger. That event object includes or is otherwise associated with the device activity data tracked between the occurrence of the first and third triggers.

Step 98 can include tracking device activity data that includes data of a plurality of types. Presenting in step 102 can include communicating a prompt for the user to indicate whether or not to record the unstructured event. That prompt identifies and allows the user to select from among the plurality of types. Upon a positive response to the prompt, the event object is recorded to include or otherwise be associated with device activity data of those types of device data selected via the prompt. Such a prompt may be a current prompt. Data type preferences can be maintained that are indicative of a first data type selected via previous prompts and a second data type not selected via the previous prompts. Communicating in step 102 can then include communicating the current prompt allowing selection from among the plurality of data types where, by default, the first data type is selected and the second data type is not selected.

CONCLUSION

FIGS. 2-5 aid in depicting the architecture, functionality, and operation of various embodiments. In particular, FIGS. 3-5 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A memory resource storing instructions that when executed cause a processing resource to implement a system for recording an unstructured event in context, the instructions comprising:
    an occurrence module for detecting an occurrence of an event by identifying a first condition at a first time and a second condition at a second time, the first and second conditions indicative of a start and end of the event and identified utilizing a sensing feature of a client device;
    an activity module for maintaining device activity data associated with a time period defined by the first and second times,
        wherein the device activity data defines an event context, comprises an activity type and activity time for each device activity associated with the time period, and represents device activity of a plurality of types; and
    an object module for generating an event object for the time period,
        wherein the object module communicates, at or after the second time, a prompt for a user to indicate whether or not to record the event,
            the prompt identifying and allowing the user to select from among the plurality of types, and
            the event object including or otherwise associated with the device activity data and including event data that identifies the first and second condition and the first and second time,
        wherein upon a positive response to the prompt, the object module generates the event object to include or otherwise be associated with activity data of those types selected via the prompt.

2. The memory resource of claim 1 wherein the prompt is a current prompt and the object engine includes instructions for:
    identifying a first type of device activity selected and a second type of device activity not selected via prompts previously communicated for the user to indicate whether or not to record previous events;
    communicating the current prompt such that, by default, activity data of the first type is selected and activity data of the second type is not.

3. The memory resource of claim 1, wherein the plurality of activity types include two or more of web sites viewed, files shared, electronic messages opened, messages communicated, and conversations recorded.

4. The memory resource of claim 1, wherein the first condition includes the occurrence of a first trigger followed, after a predetermined time frame, by a second trigger and second condition includes the occurrence of a third trigger followed, within a predetermined second time frame, by a fourth trigger;
    the activity module includes instructions for beginning to track the device activity upon the occurrence of the first trigger, stopping to track if the second trigger does not occur within the first time frame, and upon occurrence of the second trigger continuing to track the device activity until the occurrence of the fourth trigger; and
    the object module includes instructions for generating, only upon occurrence of the fourth trigger, the event object for the time period, the event object including or otherwise associated with the device activity tracked between the occurrence of the first and third triggers.

5. The memory resource of claim 1, wherein the unstructured event is an event that was not included in a calendar application prior to the occurrence engine identifying the first condition at the first time.

6. The memory resource of claim 1, wherein upon a positive response to the prompt, the event object is recorded in a calendar application.

7. A system for recording an unstructured event in context comprising:
- an activity engine to automatically maintain device activity data for a client device during a time period associated with the unstructured event, wherein the device activity defines a context, comprises an activity type and activity time for each device activity associated with the time period, and represents device activity of a plurality of types;
- an occurrence engine to utilize a sensing feature of the client device to detect occurrences of a first condition at a first time followed by a second condition at a second time, timings of the first and second conditions defining the time period; and
- an object engine to present, following an identification of the second condition, an event object for the time period,
  - wherein the object engine communicates a prompt indicating that an unstructured event has been detected, allowing selection from among the plurality of data types, and asking whether or not to store the device activity,
    - the event object including or otherwise associated with the device activity data and including event data that identifies the first and second condition and the first and second time,
  - wherein upon a response to the prompt indicating the device data is to be stored,
- recording the event object such that the event object includes or is otherwise associated with only the device activity data matching the data types selected via the prompt.

8. The system of claim 7, wherein the sensing feature is an environmental sensing feature for use in detecting at least one a position of the client device, motion of the client device, and a continued presence of other client devices.

9. The system of claim 7, wherein:
- the first condition is a change to a state where the client device is detected to be within a predefined range of another client device;
- the second condition is a change to a state where the client device is no longer detected to be within the predefined range of the other client device; and
- the device activity data includes identification data associated with the other client device and data indicative of information accessed or generated by the client device during the time period.

10. The system of claim 7, wherein the prompt is a current prompt and the object engine is configured to:
- maintain data type preferences indicative of a first data type selected via previous prompts and a second data type not selected via the previous prompts;
- communicate the current prompt allowing selection from among the plurality of data types where, by default, device activity data of the first data type is selected and device activity data of the second data type is not selected.

11. The system of claim 7, wherein the plurality of activity types include two or more of web sites viewed, files shared, files accessed, electronic messages opened, messages communicated, and conversations recorded.

12. The system of claim 7, wherein the unstructured event is an event that was not included in a calendar application prior to the occurrence engine identifying the first condition at the first time.

13. A method for recording an unstructured event in context, comprising:
- detecting a first occurrence indicative of a start to the unstructured event utilizing a sensing feature of a client device;
- upon detection of the first occurrence, tracking device activity data associated with the client device, wherein the device activity data comprises an activity type and activity time for each device activity and represents device activity of a plurality of types;
- detecting a second occurrence indicative of an end to the unstructured event utilizing the sensing feature;
- following detection of the second occurrence, presenting an event object for the unstructured event spanning between the first and second events,
  - wherein presenting comprises communicating a prompt for the user to indicate whether or not to record the unstructured event,
    - the prompt identifying and allowing the user to select from among the plurality of types of device activity, and
    - the event object including or otherwise associated with the device activity data tracked during the timespan and including event data that identifies the first and second occurrence, a start time, and an end time,
  - wherein upon a positive response to the prompt, recording the event object, the event object including or otherwise associated with activity data of those types selected via the prompt.

14. The method of claim 13, wherein:
- detecting a first occurrence comprises detecting an occurrence of a first trigger followed after a predetermined first time frame by a second trigger;
- detecting the second occurrence includes detecting an occurrence of a third trigger followed within a predetermined second time frame by a fourth trigger;
- tracking comprises beginning to track the device activity data upon the occurrence of the first trigger and stopping to track if the second trigger does not occur within the first time frame; and
- presenting comprises presenting the event object only upon occurrence of the fourth trigger, the event object including or otherwise associated with the device activity data tracked between the occurrence of the first and third triggers.

15. The method of claim 13, wherein the prompt is a current prompt, the method comprising maintaining data type preferences indicative of a first data type selected via previous prompts and a second data type not selected via the previous prompts and wherein communicating comprises communicating the current prompt allowing selection from among the plurality of data types where, by default, the first data type is selected and the second data type is not selected.

16. The method of claim 13, wherein:
- the first occurrence is a change to a state where the client device is detected to be within a predefined range of another client device;
- the second occurrence is a change to a state where the client device is no longer detected to be within the predefined range of the other client device; and the device activity data includes identification data associated with the other client device and data indicative of information accessed or generated by the client device during the time period.

17. The method of claim 13, wherein the plurality of activity types include two or more of web sites viewed, files shared, files accessed, electronic messages opened, messages communicated, and conversations recorded.

* * * * *